US012586844B2

(12) United States Patent
Huang et al.

(10) Patent No.: US 12,586,844 B2
(45) Date of Patent: Mar. 24, 2026

(54) COMPOSITE MATERIAL HAVING FUNCTION OF ISOLATING HEAT AND COMBUSTION SUPPORTING GAS

(71) Applicant: COOMMEE CO., LTD., New Taipei City (TW)

(72) Inventors: Chun-Feng Huang, New Taipei City (TW); Pei-Jan Ho, New Taipei City (TW)

(73) Assignee: COOMMEE CO., LTD., New Taipei City (TW)

( * ) Notice: Subject to any disclaimer, the term of this patent is extended or adjusted under 35 U.S.C. 154(b) by 307 days.

(21) Appl. No.: 18/538,459

(22) Filed: Dec. 13, 2023

(65) Prior Publication Data

US 2024/0283054 A1     Aug. 22, 2024

(30) Foreign Application Priority Data

Feb. 17, 2023    (TW) .................................. 112105748

(51) Int. Cl.
*H01M 10/658*          (2014.01)
*B32B 5/02*            (2006.01)
(Continued)

(52) U.S. Cl.
CPC ............. H01M 10/658 (2015.04); B32B 5/02 (2013.01); B32B 5/18 (2013.01); B32B 27/065 (2013.01);
(Continued)

(58) Field of Classification Search
CPC ............... H01M 10/653; H01M 10/658; F16L 59/00–59/22; B32B 5/18–5/32; B32B 27/308
See application file for complete search history.

(56) References Cited

U.S. PATENT DOCUMENTS

2004/0241417 A1* 12/2004 Fischer ..................... B32B 7/06
                                                            428/317.9
2021/0163303 A1* 6/2021 Evans ..................... B32B 5/024
2021/0257690 A1* 8/2021 Kilhenny ............... B32B 25/04

FOREIGN PATENT DOCUMENTS

CN          114639899 A  *  6/2022  .......... H01M 10/658

OTHER PUBLICATIONS

Wang et al. "Flame Retardancy, Fire Behavior, and Flame Retardant Mechanism of Intumescent Flame Retardant EPDM Containing Ammonium Polyphosphate/Pentaerythrotol and Expandable Graphite", Materials (2019), 12, 4035; pp. 1-15.*
(Continued)

*Primary Examiner* — Prashant J Khatri
(74) *Attorney, Agent, or Firm* — LANWAY IPR SERVICES; Chun-Ming Shih

(57)          ABSTRACT

A composite material having a function of isolating heat and combustion supporting gases is disclosed. A layered structure of the composite material includes a carbon-silicon foam layer, a first acrylic resin layer, a glass fiber cloth layer, a second acrylic resin layer, a first silicone layer, a carbon fiber layer, a second silicone layer, a quartz wool layer, and a third silicone layer. Due to the layered structure of carbon-silicon foam material, glass fiber cloth, carbon fiber and quartz wool, the composite material can provide functions such as heat insulation, combustion-supporting gases insulation, heat conduction, and anti-breakdown for protecting lithium-ion batteries from thermal runaway.

17 Claims, 4 Drawing Sheets

(51) Int. Cl.

| | |
|---|---|
| *B32B 5/18* | (2006.01) |
| *B32B 27/06* | (2006.01) |
| *B32B 27/08* | (2006.01) |
| *B32B 27/12* | (2006.01) |
| *B32B 27/28* | (2006.01) |
| *B32B 27/30* | (2006.01) |
| *C09K 21/02* | (2006.01) |
| *C09K 21/14* | (2006.01) |
| *F16L 59/02* | (2006.01) |
| *H01M 10/653* | (2014.01) |

(52) U.S. Cl.
CPC .............. *B32B 27/08* (2013.01); *B32B 27/12* (2013.01); *B32B 27/283* (2013.01); *B32B 27/308* (2013.01); *C09K 21/02* (2013.01); *C09K 21/14* (2013.01); *F16L 59/028* (2013.01); *F16L 59/029* (2013.01); *H01M 10/653* (2015.04); *B32B 2250/05* (2013.01); *B32B 2262/101* (2013.01); *B32B 2262/106* (2013.01); *B32B 2266/053* (2016.11); *B32B 2266/057* (2016.11); *B32B 2307/304* (2013.01); *B32B 2307/3065* (2013.01); *B32B 2307/7376* (2023.05); *B32B 2457/10* (2013.01)

(56) References Cited

OTHER PUBLICATIONS

Di et al. "Modulation of Thermal Insulation and Mechanical Property of Silica Aerogel Thermal Insulation Coatings", Coatings (2022) 12, 1421; pp. 1-9.*

* cited by examiner

COMPOSITE MATERIAL HAVING FUNCTION OF ISOLATING HEAT AND COMBUSTION SUPPORTING GAS

FIELD OF THE INVENTION

The present invention relates to a composite material, especially to a composite material with a function of isolating heat and combustion supporting gases for preventing thermal propagation, deflagration, or fire of secondary batteries under thermal runaway.

BACKGROUND OF THE INVENTION

Lithium-ion batteries have become the mainstream power supply of electronic products now. It has advantages of fast charging, large battery capacity, smaller volume, etc. However, the lithium-ion battery still has certain problems while in use including weakened power at low temperature, reduced power caused by lithium dendrite after being used for a period of time, thermal runaway, etc. The thermal runaway occurs when heat generating rate of internal short circuit of the battery is much higher than heat dissipation rate and lots of built-up heat is unable to be dispersed. Over time, changes caused by the increased temperature further rise the temperature and form a vicious circle and thermal propagation. The thermal runaway is a series of irreversible chain reactions. The internal temperature of the lithium-ion battery increases dramatically within seconds and energy stored therein is suddenly released. Thus extremely high temperatures ranging from 500° C. to 1000° C. is created and hot combustible gases are produced by a part of materials of the lithium-ion battery due to high temperature. The combustible gases sprayed out for release pressure may explode and further cause fires extremely hard to put out by normal ways.

The following are several ways to prevent thermal runaway of the lithium-ion battery available now. High temperature resistant plastic materials are used to isolate battery cells and increase an interval between the adjacent battery cells. Carbon steel covers the lithium-ion battery to form a battery pack for prevention of thermal runaway and propagation. Use thermal insulation planar material such as mica, ceramic plate, silica plate, carbon fiber fabric, or steel plate to isolate heat transfer. Yet the 2-D thermal insulation planar material can only be attached to an inner side of the housing for high temperature resistance and prevention of melting. It's unable to prevent the lithium-ion battery cell from producing gases and having impacts under thermal runaway. Once the battery cell explodes, the planar material is easily broken. Thus air outside such as oxygen is introduced into the lithium-ion battery to re-ignite or blast with fire. Moreover, such kind of materials are lack of expansion triggered by heat and thus unable to prevent spread and diffusion of hot gasses in the lithium-ion battery (pack).

In order to solve the problems of the lithium-ion battery caused by thermal runaway effectively, there is room for improvement and there is a need to provide a novel composite material.

SUMMARY

This paragraph only extracts certain features of the present invention while others are provided in the following paragraphs. Various modification and similar arrangements should be encompassed in the scope of the present invention.

Therefore, it is a primary object of the present invention to provide a composite material with a function of isolating heat and combustion supporting gases for preventing a potential source of heat which generates heat with temperature over 150° C. and combustible gases under abnormal conditions from releasing heat and combustible gasses. Thereby problems caused by thermal runaway of lithium-ion batteries can be solved effectively. In order to achieve the above object, a composite material according to the present invention includes a carbon-silicon foam layer made of carbon-silicon foam, and a first acrylic resin layer formed over the carbon-silicon foam layer and made of acrylic resin. While in use, the carbon-silicon foam layer is facing the potential source of heat so that expansion of the carbon-silicon foam can prevent combustible gases from contact with combustion supporting gases outside.

The composite material with a function of isolating heat and combustion supporting gases further includes a glass fiber cloth layer disposed over the first acrylic resin layer and made of glass fiber cloth, a second acrylic resin layer arranged over the glass fiber cloth layer and made of acrylic resin, and a first silicone layer mounted over the second acrylic resin layer and made of silicone.

The composite material with a function of isolating heat and combustion supporting gases further includes a carbon fiber layer formed over the first silicone layer and made of carbon fiber, and a second silicone layer disposed over the carbon fiber layer and made of silicone.

The composite material with a function of isolating heat and combustion supporting gases further includes a quartz wool layer formed over the second silicone layer and made of quartz wool, and a third silicone layer arranged over the quartz wool layer and made of silicone.

The composite material with a function of isolating heat and combustion supporting gases is further modified to have the following structure: a quartz wool layer formed over the first acrylic resin layer and made of quartz wool and a third silicone layer arranged over the quartz wool layer and made of silicone, or a quartz wool layer formed over the first silicone layer and made of quartz wool and a third silicone layer arranged over the quartz wool layer and made of silicone.

Preferably, the carbon-silicon foam is a mixture of fibers, intumescent flame retardants, and adhesives.

Preferably, the fiber can be chemical fiber, paper fiber, carbon fiber, or mineral fiber.

Preferably, the intumescent flame retardant includes expanded graphite powder, ammonium polyphosphate, and pentaerythritol.

Preferably, the adhesive can be water-based acrylic resin or water-based polyurethane.

Preferably, a total thickness between an outer surface of the carbon-silicon foam layer and an outer surface of the first silicone layer is ranging from 0.5 mm to 2.5 mm.

A composition of the composite material can contain 80-85 weight percentage of the carbon-silicon foam, 2-4 weight percentage of the acrylic resin, 5-10 weight percentage of the glass fiber cloth, and 2-4 weight percentage of the silicone. A composition of the composite material can also include 80-85 weight percentage of the carbon-silicon foam, 2-4 weight percentage of the acrylic resin, 5-10 weight percentage of the glass fiber cloth, 4-8 weight percentage of the silicone, and 5-15 weight percentage of the carbon fiber. A composition of the composite material further contains 60-65 weight percentage of the carbon-silicon foam, 2-4 weight percentage of the acrylic resin, 5-10 weight percentage of the glass fiber cloth, 6-12 weight percentage of the silicone, 5-15 weight percentage of the carbon fiber, and 20-25 weight percentage of the quartz wool.

The total thickness between an outer surface of the carbon-silicon foam layer and an outer surface of the first silicone layer starts to expand after being heated over 150 degrees Celsius and its expansion ratio is as below. The expansion ratio is 5, 10, 25, 30, and 35 respectively at 155±5° C., 200±5° C., 250±5° C., 300±5° C., and 350±5° C. For the composite material, it takes a period of time to reach a certain expansion ratio at specific temperature. The time required is 16±1 seconds at 155±5° C., 17±1 seconds at 200±5° C., 18±1 seconds at 250±5° C., 21±1 seconds at 300±5° C., and 25±1 seconds at 350±5° C. A composition of the carbon-silicon foam includes 72-74 weight percentage of the fibers, 5-7 weight percentage of the intumescent flame retardants, and 3-4 weight percentage of the adhesives. As to a composition of the intumescent flame retardants, it includes 1.5-2 weight percentage of the expanded graphite powder, 1.2-1.5 weight percentage of the ammonium polyphosphate, and 0.3-0.5 weight percentage of the pentaerythritol.

Owing to the layered structure formed by the carbon-silicon foam, the glass fiber cloth, the carbon fiber, and the quartz wool, the present composite material provides functions including thermal isolation, isolation of combustion supporting gases, heat conduction, prevention of breakthrough, etc. for protection of the lithium-ion battery from thermal runaway. In practice, the present composite material can be used to prevent energy storage batteries from thermal runaway. The energy storage batteries are used in backup battery unit (BBU) in open the compute project (OCP), battery module of Uninterruptible Power Supply (UPS), or battery module of Battery Energy Storage Systems (BESS). Besides the cylindrical battery, the lithium-ion battery mentioned in the present invention can also be prismatic battery with metal housing, packaged battery, or pouch battery.

DETAILED DESCRIPTION

Please refer to the following embodiments, the present invention is more specifically described in more detail.

Figures 1, 2:
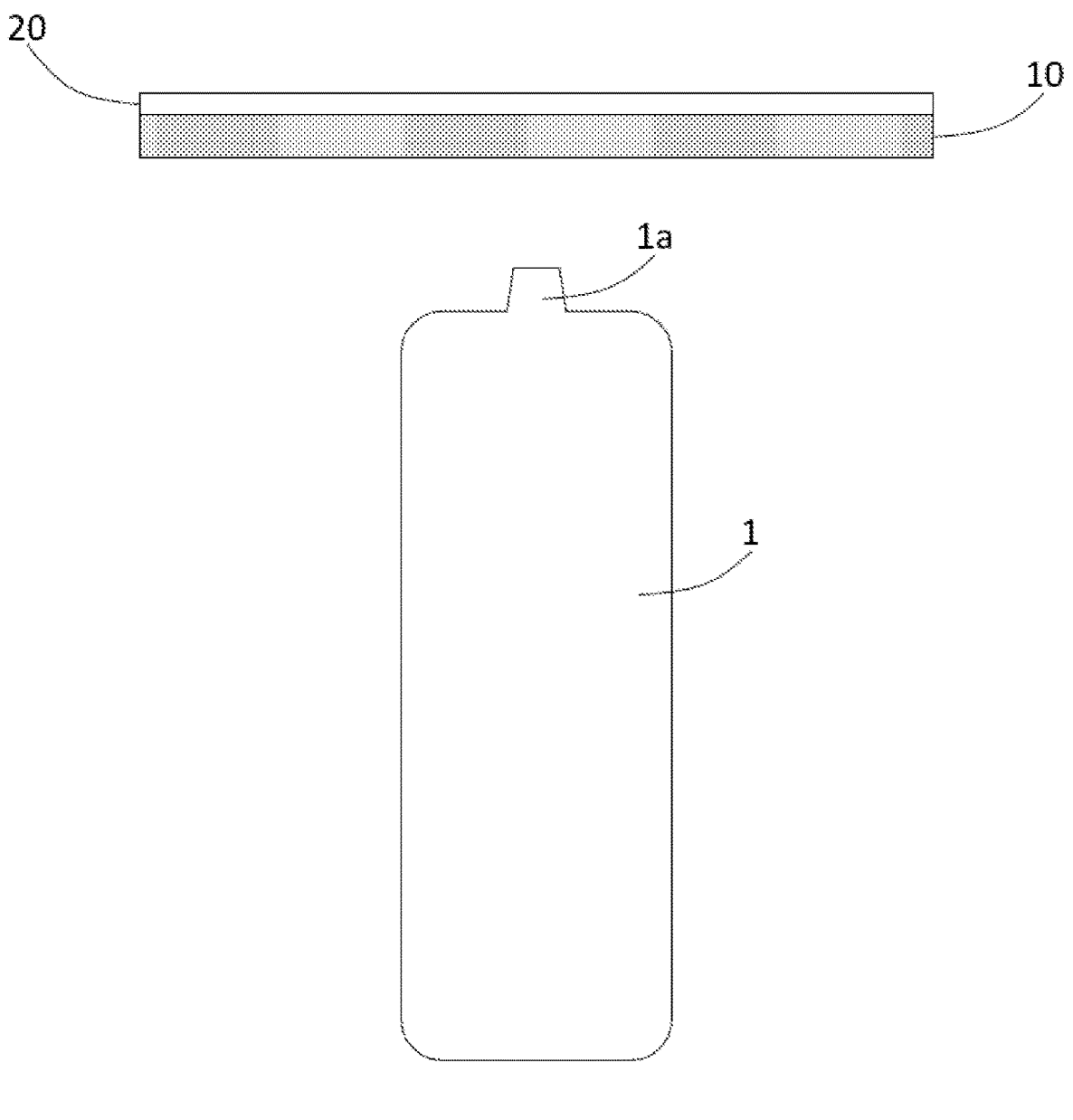
FIG. 1 is a schematic drawing showing structure of an embodiment of a composite material having a function of isolating heat and combustion supporting gases in use according to the present invention.
FIG. 2 is a schematic drawing showing structure of another embodiment of a composite material having a function of isolating heat and combustion supporting gases according to the present invention.

Refer to FIG. 1, a schematic drawing showing structure of an embodiment of a composite material having a function of isolating heat and combustion supporting gases in use according to the present invention is provided. The composite material is used to prevent a potential source of heat which generates heat with temperature over 150° C. and combustible gases under abnormal conditions from releasing heat and combustible gases during thermal runaway. More specifically, the composite material is suitable for the potential source of heat such as the lithium-ion battery. The working temperature of the lithium-ion battery is usually quite narrow (−20° C.-50° C. and the optimal working temperature is 20° C.-40° C.). Sudden increases in temperature and vaporization of materials will not happen under stable operation. While being damaged and under abnormal conditions such as short circuit caused by deformation, overcharge with voltage over the maximum voltage listed in data sheet, or overcurrent during charging and discharging, the lithium-ion battery may have thermal runaway. At the moment, vaporized materials inside the lithium-ion battery are released to the outside through a vent valve at the positive electrode. These gases are combustible and very hot so that high temperature combustion (500° C.~1000° C.) and continuous flame easily appear inside lithium-ion battery once the gases released are in contact with combustion supporting gases such as oxygen gas in the environment. More violent explosion may appear along with reactions of combustible substances inside the battery cell and the gases generated. When the thermal runaway occurs, besides reduction of temperature as soon as possible for lowering losses, users need to provide pathways for dispersion of heat at early stage, prevent blasting caused by explosion of the battery cell, and isolate the battery from contact with ambient air. Lastly expansion of materials fills space inside the lithium-ion battery (stack) to prevent the lithium-ion battery (stack) from burning again. Thus there is room for improvement and there is a need to provide a composite material which is used for the potential sources of heat such as the lithium-ion battery and able to solve the above problems.

In an embodiment, a composite material according to the present invention includes the following structure: a carbon-silicon foam layer 10 made of carbon-silicon foam and an acrylic resin layer 20 made of acrylic resin and formed over the carbon-silicon foam layer 10. In order to show respective details of the multi-layer structure of the present composite material, a ratio of the respective layers in a thickness direction is larger than a ratio of the respective layers in a length direction. According to actual combinations, a thickness of the respective layers of the composite material is not drawn to scale. The figures are only used for illustrative purposes, not intended to limit the thickness of the respective layers.

The carbon-silicon foam which is a mixture of fibers, intumescent flame retardants, and adhesives is a core component of the present invention. In the present invention, the fibers used can be chemical fibers, paper fibers, carbon fibers, or mineral fiber. In the following embodiments, take paper fibers as an example. As to the intumescent flame retardant, it includes expanded graphite powder, ammonium polyphosphate, and pentaerythritol. The intumescent flame retardant starts to expand at about 150 degrees Celsius after being triggered. The adhesive is water-based acrylic resin or water-based polyurethane. In the following embodiments, take water-based polyurethane as an example. As to a composition of the composite material, the carbon-silicon foam includes 72-74 weight percentage of fiber, 5-7 weight percentage of intumescent flame retardant, and 3-4 weight percentage of adhesive. For example, 720 g fiber, 50 g intumescent flame retardant, and 30 g adhesive are mixed and stirred to form 800 g carbon-silicon foam and this is the best ratio. When the carbon-silicon foam is heated, it is unable foaming effectively once a ratio of the fiber or the intumescent flame retardant is too high and this causes waste of the materials. Moreover, excessive fluidity and poor adhesion of the overall material can be avoided because that the ratio of the adhesive is optimal while in use. As to the intumescent flame retardant, its composition is 1.5-2 weight percentage of expanded graphite powder, 1.2-1.5 weight percentage of ammonium polyphosphate, and 0.3-0.5 weight percentage of pentaerythritol. For example, 20 g expanded graphite powder, 15 g ammonium polyphosphate, and 5 g pentaerythritol are mixed evenly to form 40 g intumescent flame retardant. The acrylic resin layer 20 formed over the carbon-silicon foam layer 10 provides a shaping of the carbon-silicon foam layer 10 because that the carbon-silicon foam is soft. At the same time, the acrylic resin layer 20 can also provide support in specific directions when the carbon-silicon foam is foamed at high temperature. As shown in FIG. 1, while in use, the carbon-silicon foam layer 10 is facing a potential source of heat (positive electrode 1a of a lithium-ion battery 1) so that expansion of the carbon-silicon foam is toward the lithium-ion battery 1. Thus the positive electrode 1a is completely or partially covered for isolating combustible gasses from external combustion supporting gases, without contact with each other. Heat generated by the lithium-ion battery 1 can be temporarily sealed in the foam structure.

Refer to FIG. 2, a schematic drawing showing structure of another embodiment of a composite material having function of isolating heat and combustion supporting gases is provided. Based on the first embodiment, the second embodiment further includes the following structure: a glass fiber cloth layer 30 formed over the first acrylic resin layer 20 and made for glass fiber cloth, a second acrylic resin layer 40 arranged over the glass fiber cloth layer 30 and made of acrylic resin, and a first silicon layer 50 disposed over the second acrylic resin layer 40 and made of silicone. The glass fiber cloth layer 30 not only strengths the function of isolating heat and combustion supporting gases of both the carbon-silicon foam layer 10 and the acrylic resin layer 20, but also provides basic function of prevention of blast and hit by explosives. The first acrylic resin layer 20 is fixed and connected with the carbon-silicon foam layer 10 and the glass fiber cloth layer 30 while the second acrylic resin layer 40 is fixed and connected with the glass fiber cloth layer 30 and the first silicon layer 50. Since silicone is resistant to high temperature and having a certain adhesion strength for attaching the composite material to external objects such as an installation housing of the lithium-ion battery, the lithium-ion battery will not come off from the installation housing during thermal runaway of the lithium-ion battery. Thereby the carbon-silicon foam layer 10 foams stably to protect the lithium-ion battery.

Generally speaking, the composite material in this embodiment has a composition of 80-85 weight percentage of carbon-silicon foam material, 2-4 weight percentage of acrylic resin (for producing the first acrylic resin layer 20 and the second acrylic resin layer 40), 5-10 weight percentage of glass fiber cloth, and 2-4 weight percentage of silicone. For example, use 82 g carbon-silicon foam, 1.5 g acrylic resin, 8 g glass fiber cloth, 1.5 g acrylic resin, and 4 g silicone respectively to produce the carbon-silicon foam layer 10, the first acrylic resin layer 20, the glass fiber cloth layer 30, the second acrylic resin layer 40, and the first silicone layer 50. Lastly, 100 g composite material is obtained. As to the structure, a thickness of the composite material is thinner than conventional materials with functions of isolation heat and combustion supporting gases. According to the present invention, a total thickness between an outer surface of the carbon-silicon foam layer 10 and an outer surface of the first silicone layer 50 is ranging from 0.5 mm to 2.5 mm.

The overall thickness between the outer surface of the carbon-silicon foam layer 10 and the outer surface of the first silicone layer 50 starts to increase while being heated over 150° C. and its expansion ratio is shown in the following table 1. It is learned from the table 1 that the composite material is expanding the most between 150° C. and 250° C. and able to prevent the lithium-ion battery from contact with ambient air in the beginning of thermal runaway. Moreover, the table 1 also provides time required to reach certain expansion ratio at specific temperature. The reaction time is quite short.

TABLE 1

| Temperature | 155 ± 5° C. | 200 ± 5° C. | 250 ± 5° C. | 300 ± 5° C. | 350 ± 5° C. |
|---|---|---|---|---|---|
| expansion ratio | 5X | 10X | 25X | 30X | 35X |
| expansion time | 16 ± 1 sec | 17 ± 1 sec | 18 ± 1 sec | 21 ± 1 sec | 25 ± 1 sec |

Thermal conductivity of the composite material is explained as below. After being heated and expanded, the composite material has uneven thickness so that its thermal conductivity coefficient is difficult to measure. The thermal conductivity of the composite material in this embodiment is obtained by the following experiment. As to materials, prepare a piece of composite material with size of 70 mm×40 mm×1.8 mm. Experimental apparatus includes an alcohol lamp (temperature of the center of the flame is 400~500° C.) and two infrared thermometers. The experimental environment is a closed space (without air flow) at a constant temperature of 27.5° C. The following are experimental steps. First light the alcohol lamp and place the carbon-silicon foam layer 10 of the composite material close to the alcohol lamp with a distance of 1 cm between them. Then measure temperature of a front surface (the carbon-silicon foam layer 10) and temperature of a back surface (the first silicone layer 50) of the composite material per an interval of 30 seconds by the corresponding infrared thermometers. The experimental results are shown in the following table 2. It is learned from the table 2 that a temperature difference between the front surface and the back surface is increased along with increasing time. This proves most of heat generated from the heat source is absorbed by the carbon-silicon foam and a rise in the temperature of the back surface is reduced.

TABLE 2

| time | 30 s | 60 s | 90 s | 120 s | 150 s |
|---|---|---|---|---|---|
| Temperature of front surface | 112° C. | 205° C. | 362° C. | 387° C. | 401° C. |
| Temperature of back surface | 67° C. | 69° C. | 91° C. | 94° C. | 100° C. |

Figure 3:
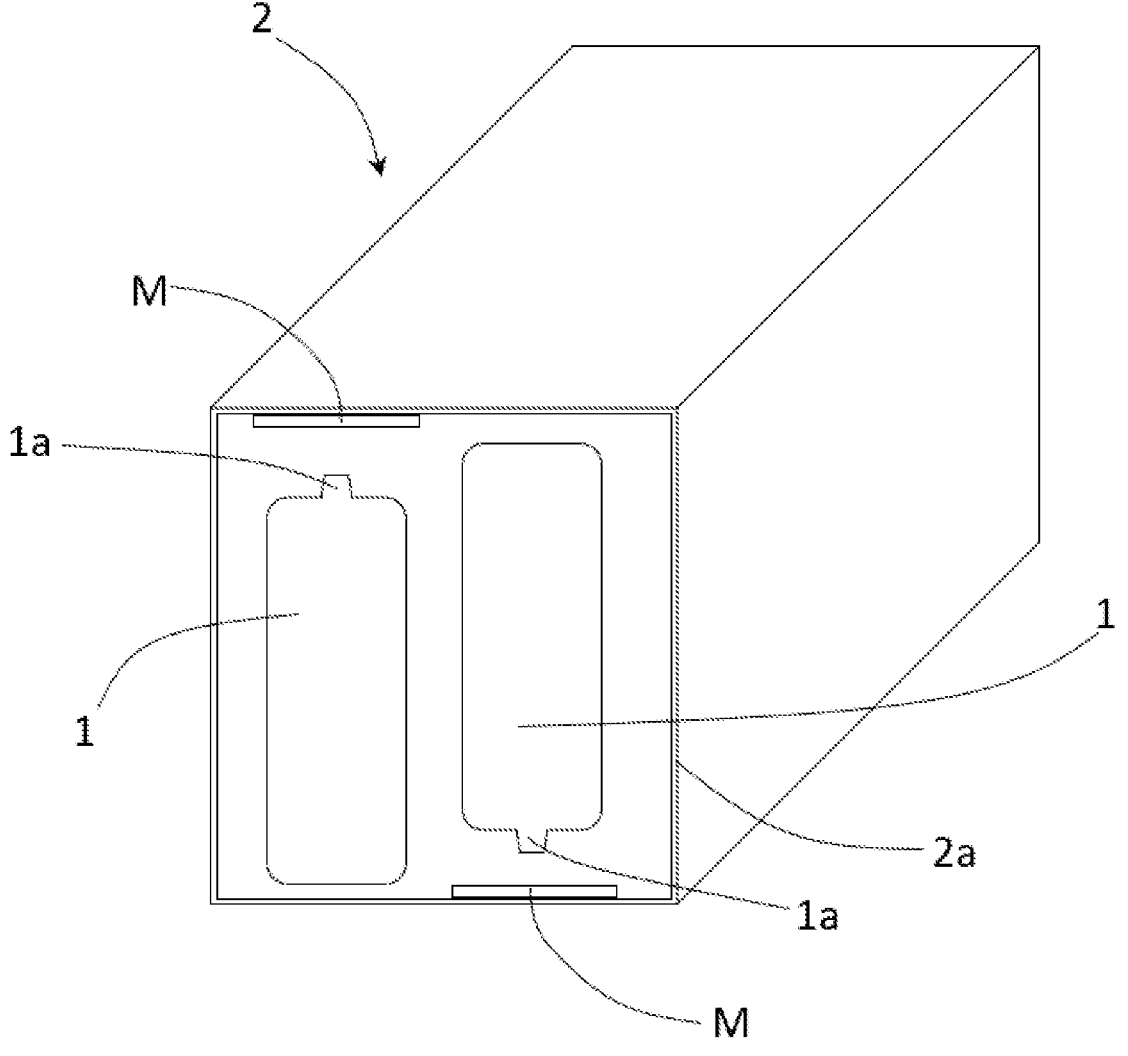
FIG. 3 is a schematic drawing showing an embodiment of a composite material in use according to the present invention.

Refer to FIG. 3, a figure showing an embodiment of the composite material in use is provided. FIG. 3 is a section of a battery set 2 which includes a plurality of lithium-ion batteries 1 connected in series or parallel. A composite material M is attached to an inner surface of a housing 2a of the battery set 2 and facing a positive electrode 1a of the lithium-ion battery 1, without contact with the positive electrode 1a. Since the housing 2a of the battery set 2 is sealed, combustible gases generated due to thermal runaway of the lithium-ion battery 1 are limited inside the housing 2a, without diffusion outside. Now the composite material M is mainly used for isolation of heat.

Figure 4:
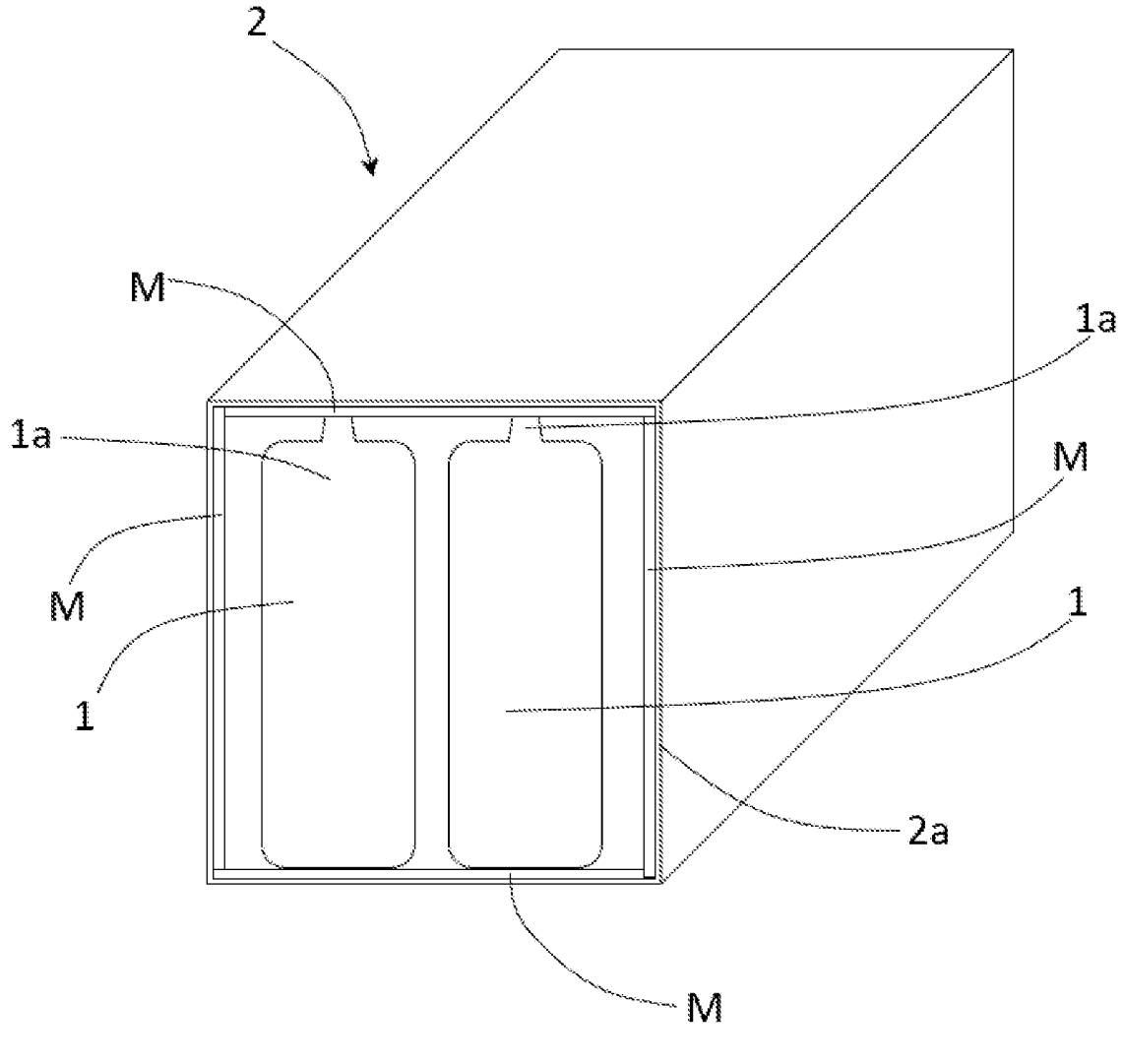
FIG. 4 is a schematic drawing showing an embodiment of a composite material in another use according to the present invention.

Refer to FIG. 4, a figure shows an embodiment of a composite material in another use is provided. The embodiment in FIG. 4 is obtained by modification of the embodiment in FIG. 3. A composite material M is attached to an inner surface of a housing 2a of a battery set 2 completely and in contact with a positive electrode 1a of a lithium-ion battery 1. When thermal runaway of the lithium-ion battery 1 occurs, combustible gases generated are limited inside the housing 2a. At the moment, the composite material M is also mainly used for heat isolation but better than the embodiment in FIG. 3. Moreover, the carbon-silicon foam layer 10 is covering the positive electrode 1a instantly to prevent the positive electrode 1a from contact with air inside the housing 2a and further isolate combustion supporting gases.

Figure 5:
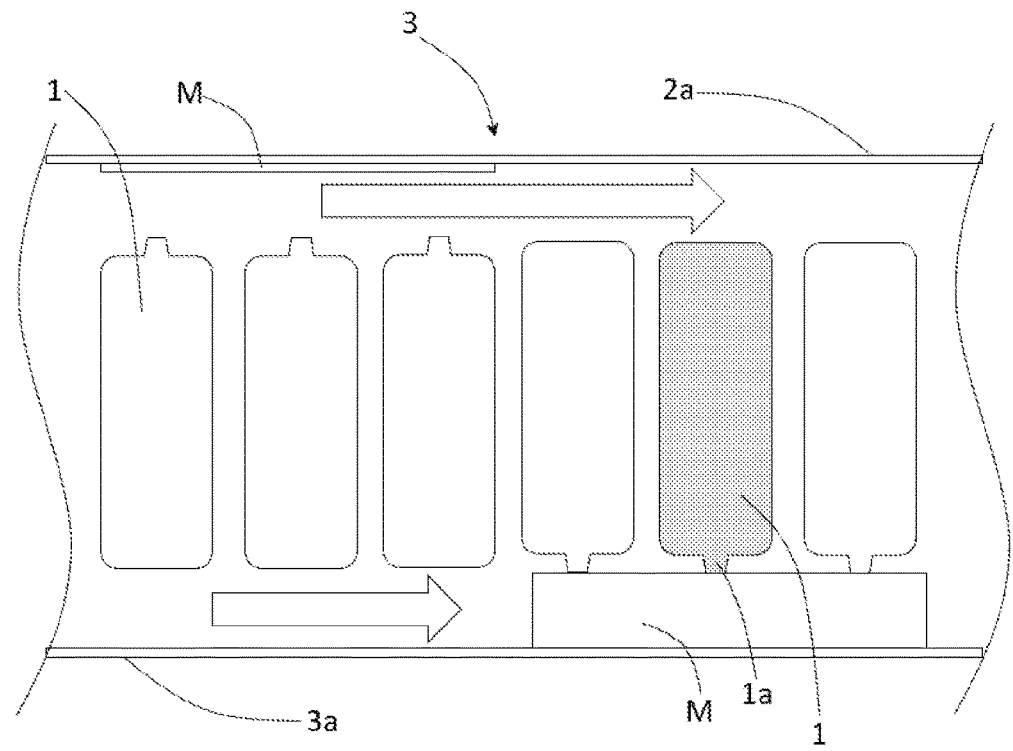
FIG. 5 is a schematic drawing showing an embodiment of a composite material in a further use according to the present invention.

Refer to FIG. 5, a figure showing an embodiment of a composite material in a further use is provided. A partial section of a battery set 3 with a design of internal ventilation pipes is provided in FIG. 5. In FIG. 5, the battery set 3 includes two ventilation pipes therein, one is in an upper position while the other is in a lower position and directions of air flows are represented by hollow arrows. A plurality of lithium-ion batteries 1 is connected in series or parallel in the battery set 3. A composite material M is attached to an inner surface of a housing 3a of the battery set 3 and facing a positive electrode 1a of the lithium-ion battery 1, without contact with the positive electrode 1a. When thermal runaway of the lithium-ion battery 1 in grey color happens, the composite material M expands to obstruct the ventilation pipe in the lower position and isolate combustion supporting gases from the lithium-ion battery 1 with the thermal runaway (as well as a plurality of normal lithium-ion batteries surrounding the gray lithium-ion battery 1). Thereby losses caused by the thermal runaway is reduced and heat generated by the lithium-ion battery 1 with the thermal runaway is passed through the ventilation pipe in the upper position to have convection outside the battery set 3. Moreover, the composite material M without expansion keeps the ventilation pipe in the upper position clear so that maintenance personnel can replace the lithium-ion battery 1 and clean inner space of the housing 3a conveniently.

Figure 6:
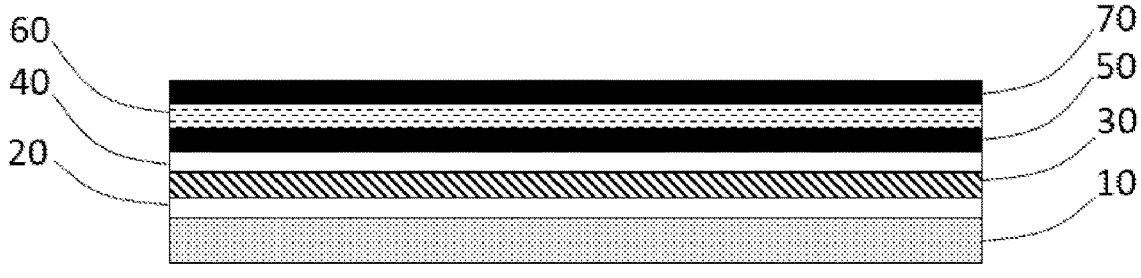
FIG. 6 is schematic drawing showing structure of a third embodiment of a composite material having a function of isolating heat and combustion supporting gases according to the present invention.

Refer to FIG. 6, a schematic drawing showing structure of a third embodiment of a composite material having a function of isolating heat and combustion supporting gases according to the present invention is provided. In addition to isolation of heat and combustion supporting gases, heat generated by thermal runaway is transferred to two sides of the composite material under guidance of the present invention. Yet structure of this embodiment is a bit different from others. Based on the second embodiment, the third embodiment further includes a carbon fiber layer 60 formed over the first silicone layer 50 and made of carbon fiber, and a second silicone layer 70 formed over the carbon fiber layer 60 and made of silicone. The carbon fiber has good thermal conductivity, able to transfer heat from the first silicone layer 50 toward the two sides. Now the first silicone layer 50 is used to fix and connect with the carbon fiber layer 60 while the second silicone layer 70 is used to attach the composite material to external consolidating material. As to its composition, the third embodiment of the composite material includes 80-85 weight percentage of carbon-silicon foam material, 2-4 weight percentage of acrylic resin (for the first acrylic resin layer 20 and the second acrylic resin layer 40), 5-10 weight percentage of glass fiber cloth, 4-8 weight percentage of silicone (for the first silicone layer 50 and the second silicone layer 70), and 5-15 weight percentage of carbon fiber.

Figure 7:
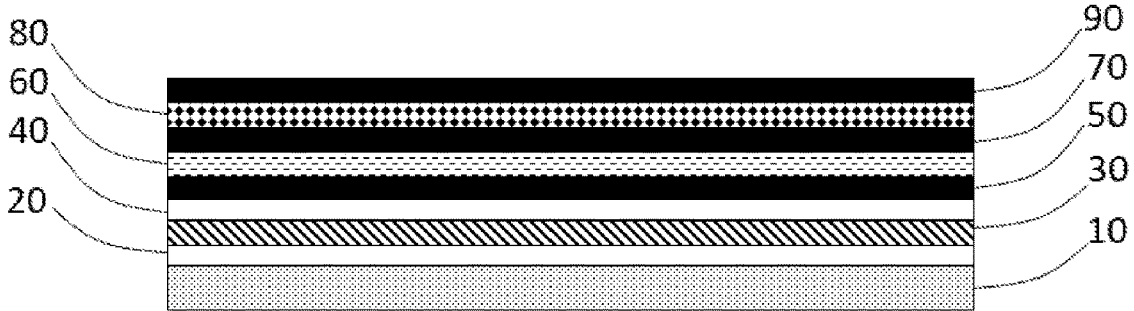
FIG. 7 is schematic drawing showing structure of a fourth embodiment of a composite material having a function of isolating heat and combustion supporting gases according to the present invention.

Refer to FIG. 7, a schematic drawing showing structure of a fourth embodiment of a composite material with a function of isolating heat and combustion supporting gases according to the present invention is provided. In addition to the function of the third embodiment mentioned above, the present composite material further prevents a risk of being blasted or hit due to explosion of the lithium-ion battery caused by the thermal runaway. Based on the third embodiment, the fourth embodiment further includes a quartz wool layer 80 formed over the second silicone layer 70 and made of quartz wool, and a third silicone layer 90 formed over the quartz wool layer 80 and made of silicone. The quartz wool is produced by high-purity silicon dioxide and natural quartz crystal and having excellent properties including high temperature resistance, electrical insulating property, low thermal expansion coefficient, wave transmission properties, ablative resistance, etc. Moreover, it becomes curled and reduces excessive compression caused by filling, able to block blasting of the explosives. The second silicone layer 70 is used to fix and connect with the quartz wool layer 80 while the third silicone layer 90 is used to attach the composite material to external consolidating material. As to its composition, the fourth embodiment of the composite material contains 60-65 weight percentage of carbon-silicon foam material, 2-4 weight percentage of acrylic resin (for producing the first acrylic resin layer 20 and the second acrylic resin layer 40), 5-10 weight percentage of glass fiber cloth, and 6-12 weight percentage of silicone (used for the first silicone layer 50, the second silicone layer 70, and the third silicone layer 90), 5-15 weight percentage of carbon fiber, and 20-25 weight percentage of quartz wool.

The structure of the composite material shown in FIG. 7 is the most complete embodiment of the present invention. In fact, layered structure of the composite material can be modified according to user's needs. For example, improvement of the composite material for protection of blasting of explosives is required yet thermal conductivity is not necessary. Thus the quartz wool layer 80 is directly formed over the first acrylic resin layer 20 and then the third silicone layer 90 is formed over the quartz wool layer 80, based on structure of the first embodiment. Or based on the structure of the second embodiment, the quartz wool layer 80 is formed over the first silicone layer 50 and then the third silicone layer 90 is formed over the quartz wool layer 80. Of course a combination of the carbon fiber layer 60 with the second silicone layer 70 can be exchanged with a combination of the quartz wool layer 80 with the third silicone layer 90. This is also within the scope of the present invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

The invention claimed is:

1. A composite material having a function of isolating heat and combustion supporting gases for preventing a potential heat source which generates heat with temperature over 150° C. and combustible gases under abnormal conditions from releasing heat energy and combustible gases comprising:

a carbon-silicon foam layer made of carbon-silicon foam, and a first acrylic resin layer formed over the carbon-silicon foam layer and made of acrylic resin;

wherein the carbon-silicon foam layer is facing the potential source of heat so that expansion of the carbon-silicon foam prevents the combustible gases generated from contact with combustion supporting gases outside while in use;

wherein the composite material with a function of isolating heat and combustion supporting gases further includes a glass fiber cloth layer disposed over the first acrylic resin layer and made of glass fiber cloth, a second acrylic resin layer arranged over the glass fiber cloth layer and made of acrylic resin, and a first silicone layer mounted over the second acrylic resin layer and made of silicone.

2. The composite material as claimed in claim 1, wherein the composite material with a function of isolating heat and combustion supporting gases further includes a carbon fiber layer formed over the first silicone layer and made of carbon fiber, and a second silicone layer disposed over the carbon fiber layer and made of silicone.

3. The composite material as claimed in claim 2, wherein the composite material with a function of isolating heat and combustion supporting gases further includes a quartz wool layer formed over the second silicone layer and made of quartz wool, and a third silicone layer arranged over the quartz wool layer and made of silicone.

4. The composite material as claimed in claim 1, wherein the composite material with a function of isolating heat and combustion supporting gases further includes a quartz wool layer formed over the first acrylic resin layer and made of quartz wool, and a third silicone layer arranged over the quartz wool layer and made of silicone.

5. The composite material as claimed in claim 1, wherein the composite material with a function of isolating heat and combustion supporting gases further includes a quartz wool layer formed over the first silicone layer and made of quartz wool, and a third silicone layer arranged over the quartz wool layer and made of silicone.

6. The composite material as claimed in claim 1, wherein the carbon-silicon foam is a mixture of fibers, intumescent flame retardants, and adhesives.

7. The composite material as claimed in claim 6, wherein the fiber is selected from the group consisting of chemical fiber, paper fiber, carbon fiber, or mineral fiber.

8. The composite material as claimed in claim 6, wherein the intumescent flame retardant includes expanded graphite powder, ammonium polyphosphate, and pentaerythritol.

9. The composite material as claimed in claim 6, wherein the adhesive is water-based acrylic resin or water-based polyurethane.

10. The composite material as claimed in claim 1, wherein a total thickness between an outer surface of the carbon-silicon foam layer and an outer surface of the first silicone layer is ranging from 0.5 mm to 2.5 mm.

11. The composite material as claimed in claim 1, wherein a composition of the composite material contains 80-85 weight percentage of the carbon-silicon foam, 2-4 weight percentage of the acrylic resin, 5-10 weight percentage of the glass fiber cloth, and 2-4 weight percentage of the silicone.

12. The composite material as claimed in claim 2, wherein a composition of the composite material further contains 80-85 weight percentage of the carbon-silicon foam, 2-4 weight percentage of the acrylic resin, 5-10 weight percentage of the glass fiber cloth, 4-8 weight percentage of the silicone, and 5-15 weight percentage of the carbon fiber.

13. The composite material as claimed in claim 3, wherein a composition of the composite material contains 60-65 weight percentage of the carbon-silicon foam, 2-4 weight percentage of the acrylic resin, 5-10 weight percentage of the glass fiber cloth, 6-12 weight percentage of the silicone, 5-15 weight percentage of the carbon fiber, and 20-25 weight percentage of the quartz wool.

14. The composite material as claimed in claim 1, wherein a total thickness between an outer surface of the carbon-silicon foam layer and an outer surface of the first silicone layer starts to expand after being heated over 150 degrees Celsius and expansion ratio of the composite material is 5, 10, 25, 30, and 35 respectively at 155±5° C., 200±5° C., 250±5° C., 300±5° C., and 350±5° C.

15. The composite material as claimed in claim 14, wherein time required for the composite material to reach the specific expansion ratio at the specific temperature is 16±1 seconds at 155±5° C., 17±1 seconds at 200±5° C., 18±1 seconds at 250±5° C., 21±1 seconds at 300±5° C., and 25±1 seconds at 350±5° C.

16. The composite material as claimed in claim 6, wherein a composition of the carbon-silicon foam includes 72-74 weight percentage of the fiber, 5-7 weight percentage of the intumescent flame retardant, and 3-4 weight percentage of the adhesive.

17. The composite material as claimed in claim 16, wherein a composition of the intumescent flame retardant contains 1.5-2 weight percentage of the expanded graphite powder, 1.2-1.5 weight percentage of the ammonium polyphosphate, and 0.3-0.5 weight percentage of the pentaerythritol.

* * * * *